No. 668,084. Patented Feb. 12, 1901.
C. C. BOWEN.
ANIMAL TRAP.
(Application filed Jan. 6, 1900.)
(No Model.) 2 Sheets—Sheet 1.
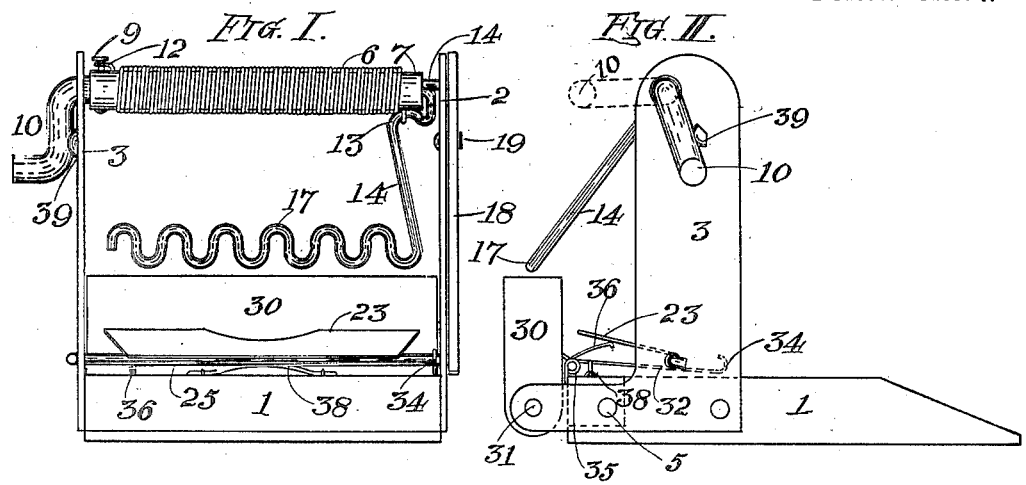
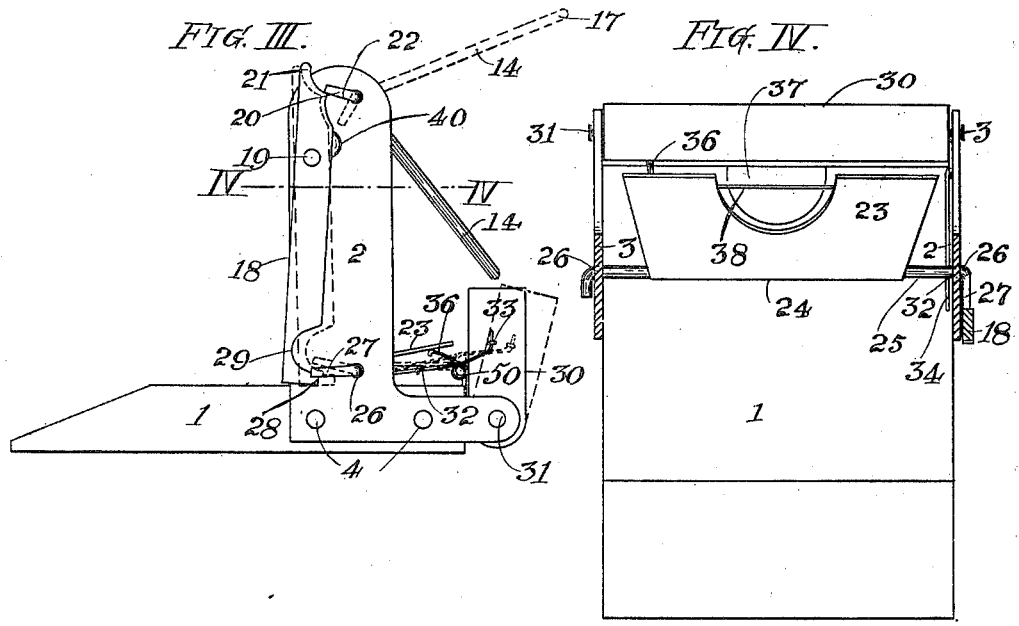
Witnesses: Inventor.

No. 668,084. Patented Feb. 12, 1901.
C. C. BOWEN.
ANIMAL TRAP.
(Application filed Jan. 6, 1900.)
(No Model.) 2 Sheets—Sheet 2.
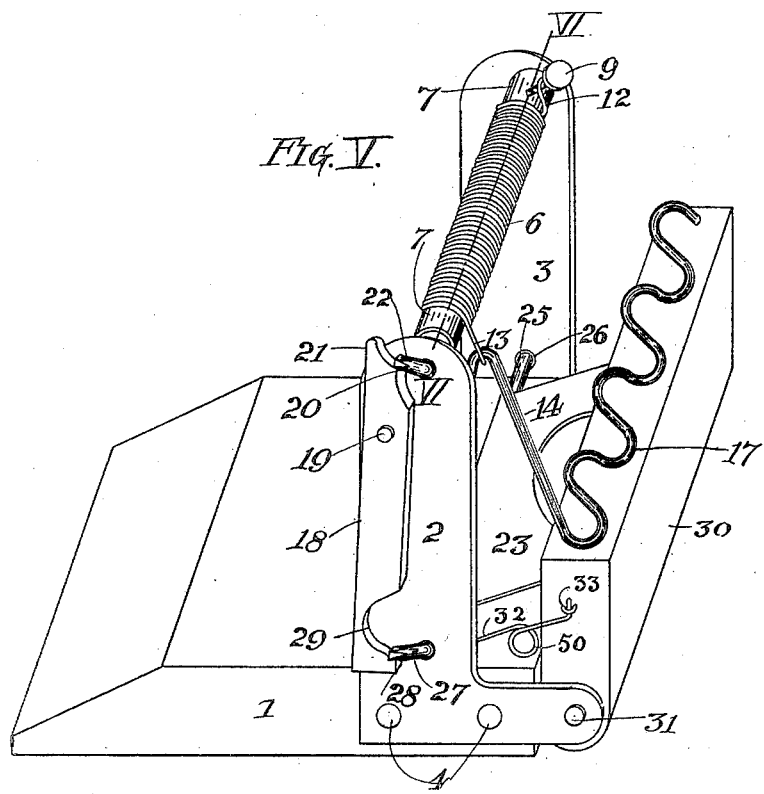
FIG. V.
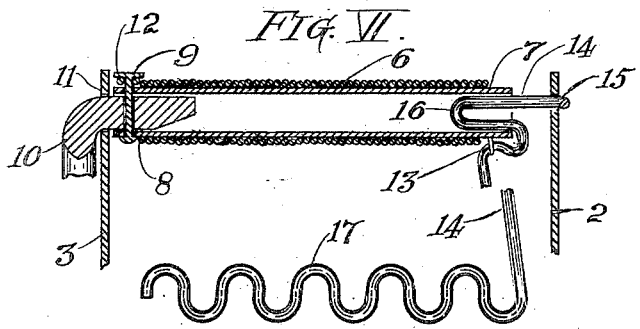
FIG. VI.
Witnesses: Inventor.

United States Patent Office.

CALVIN C. BOWEN, OF SANTA MONICA, CALIFORNIA, ASSIGNOR TO THE CYCLONE TRAP COMPANY, OF LOS ANGELES, CALIFORNIA.

ANIMAL-TRAP.

SPECIFICATION forming part of Letters Patent No. 668,084, dated February 12, 1901.

Application filed January 6, 1900. Serial No. 599. (No model.)

*To all whom it may concern:*

Be it known that I, CALVIN C. BOWEN, a citizen of the United States, with residence and post-office address at Santa Monica, in the county of Los Angeles and State of California, have invented certain new and useful Improvements in Animal-Traps, of which the following is a full, clear, and exact description, reference being had to the accompanying drawings, which form a part of this specification.

My invention relates to that form of traps in which the animal is killed outright when the trap is set off and the trap is automatically reset ready for further action; and it consists in features of novelty described and claimed.

Figure I is a rear view of my improved trap. Fig. II is a side elevation. Fig. III is a side elevation showing the opposite side from Fig. II. Fig. IV is a section taken on line IV IV, Fig. III. Fig. V is a perspective view. Fig. VI is a section taken on line VI VI, Fig. V.

Referring to the drawings, 1 represents a base-block for supporting the various parts of the trap, and 2 3 are vertical standards secured at 4 5 to the sides of the base-block.

6 represents an actuating-spring coiled upon the sleeve 7, one end of said sleeve being secured at 8 by pin 9 to a crank 10, said crank 10 being journaled at 11 to the standard 3. One end of the coil-spring 6 is secured to the pin 9 at 12. Thus as the crank 10 is rotated in a forward direction the spring 6 is contracted upon the sleeve 7, the opposite end of said spring being secured at 13 to a striker-rod 14, said striker-rod being journaled at 15 to the standard 2 and having a return-bend 16, which forms a bearing for one end of the sleeve 7 and on which the sleeve revolves as the spring is wound up.

17 represents the striker proper, which is formed of a portion of the striker-rod and bent into corrugated form, said striker extending transversely of the base-block and in its sweep covers practically all the space between the standards 2 3.

18 represents a pendent gravity-lever pivoted to the standard 2 at 19 and is provided near its upper end with shoulders 20 21.

22 represents a crank-arm on the end of the striker-rod 14, said arm coming in contact with the shoulder 20 and arresting the revolution of the striker, where it remains until the trap is set off.

23 represents a table secured at 24 to a transversely-extending rod 25, said rod being journaled at 26 to the standards 2 3.

27 represents a trigger on one end of the rod 25, the end of said trigger normally engaging a shoulder 28 on the lower end of the lever 18.

29 represents a semicircular recess at the lower end of the lever 18, immediately above the shoulder 28.

As the animal steps upon the table 23 the table is depressed. Acting upon the rod 25 it raises the outer end of the trigger 27 off of the shoulder 28, at which time the pressure of the arm 22 upon the shoulder on the upper end of the lever will cause the lever to rock as shown in dotted lines, Fig. III, thus releasing the arm 22 and permitting it and the striker to perform one revolution. The recess 29 at the bottom of the lever gives space to the action of the trigger 28 without arresting the rocking movement of said lever. As the striker 17 revolves it comes in contact with a striker-block 30, said striker-block being pivoted at 31 to the standards 2 3, the impact of the striker against the animal and the resistance of the block 30 killing the animal outright, the pressure of the striker-rod causing the block to rock backward in the position shown in dotted lines in Fig. III, the outward movement of the striking-block being limited by a rod 32, having one of its ends secured to the striking-block at 33 and having a hook 34 on its opposite end which comes in contact with the rod 25 and arrests the outward swing of said block, said block returning to its normal vertical position after the striker has passed out of engagement therewith by means of a spring-coil 50 in the rod 32. After the weight is removed from the table 23 by the animal being swept to one side by the striker the table 23 is returned to its normally-raised position by means of a coil-spring 35, having an arm 36 extending beneath said table.

37 represents a basin in the base-block 1 for the reception of bait, and 38 a bar placed across said basin to prevent the too-ready withdrawal of the bait.

39 represents a boss pressed from the standard 3 for preventing the backward movement of the crank 10, and 40 represents a boss on the standard 2 for limiting the forward movement of the upper end of the lever 18.

I claim as my invention—

1. In an animal-trap the combination of a base, standards secured to the base, foot extensions on the standards, a striker-block pivoted to the foot extensions, a revoluble striker journaled to the standards, a trigger-rod pivoted to the standards and a spring-rod for connecting the trigger-rod with the striker-block, substantially as set forth.

2. In an animal-trap the combination of a suitable base, standards secured to the base, a revolving striker, a rod having a return-bend, a sleeve having one of its ends journaled to the return-bend, a crank to which the opposite end of the sleeve is secured, an actuating-spring coiled on said sleeve, an arm on the striker-rod, a lever with which the arm engages and a trigger for releasing and holding said lever, substantially as set forth.

3. In an animal-trap the combination of a suitable base, standards secured to the base, a striker-rod journaled to one of said standards, a return-bend in the striker-rod, a sleeve fitting over said return-bend, a crank to which the sleeve is connected, an actuating-spring on the sleeve, a pin passing through the sleeve and to which one end of the sleeve is attached, the opposite end of the actuating-spring being connected with the striker-rod, substantially as set forth.

4. In an animal-trap the combination of a suitable base, vertical standards secured to the base, a revolving striker, a lever pivoted to one of said standards, means in connection with the striker for engaging the lever, a trigger-rod, a trigger on the rod for engaging the lever, a shoulder on the upper end of the lever, a shoulder and recess on the lower end of the lever, a table secured to the trigger-rod, a spring-rod for limiting the outward movement of the striking-block, substantially as set forth.

5. An animal-trap comprising a base-block, standards secured to the base-block, the sleeve, a crank-arm journaled in one of the standards, a pin whereby the sleeve is connected at one end with the crank-arm, the striker having a rod, formed with a return-bend supporting the other end of the sleeve, and with a crank-arm journaled in the other standard, an actuating-spring coiled upon the sleeve having one end secured to the pin and the other end connected with the striker, a spring-table, a rod having a trigger located beneath the crank-arm of the striker, and a gravity-lever with which the crank-arm of the striker and the trigger of the table-rod are normally engaged.

CALVIN C. BOWEN.

Witnesses:
 JAS. E. KNIGHT,
 J. A. ROELOFSZ.